United States Patent
Perez Rojo et al.

(10) Patent No.: US 9,676,230 B2
(45) Date of Patent: Jun. 13, 2017

(54) CENTER CAP FOR A MOTOR VEHICLE WHEEL

(71) Applicant: FORD GLOBAL TECHNOLOGIES, LLC, Dearborn, MI (US)

(72) Inventors: Gerardo Alejandro Perez Rojo, Metepec (MX); Laura Imelda Luengo Herrero, Cuautitlán Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/749,891

(22) Filed: Jun. 25, 2015

(65) Prior Publication Data
US 2016/0375722 A1 Dec. 29, 2016

(51) Int. Cl.
*B60B 7/06* (2006.01)
*B60B 7/08* (2006.01)
*B60B 7/00* (2006.01)
*B60B 7/14* (2006.01)

(52) U.S. Cl.
CPC ............ *B60B 7/066* (2013.01); *B60B 7/0013* (2013.01); *B60B 7/08* (2013.01); *B60B 7/14* (2013.01); *B60B 2900/115* (2013.01)

(58) Field of Classification Search
CPC ......... B60B 7/066; B60B 7/08; B60B 7/0013; B60B 7/16
See application file for complete search history.

(56) References Cited

U.S. PATENT DOCUMENTS

| | | | | |
|---|---|---|---|---|
| 1,410,506 | A | * 3/1922 | Rada | B60B 3/082 |
| | | | | 301/108.1 |
| 1,861,278 | A | 5/1932 | Kuniholm | |
| 2,217,775 | A | * 10/1940 | Smith | B60B 7/16 |
| | | | | 301/108.1 |
| 3,220,776 | A | 11/1965 | Golden | |
| 3,528,705 | A | 9/1970 | Oldroyd | |
| 4,040,672 | A | 8/1977 | Imahashi | |
| 7,131,705 | B1 | 11/2006 | DelVecchio et al. | |
| 7,651,171 | B2 | 1/2010 | Kinslow et al. | |
| 2014/0152079 | A1* | 6/2014 | Vickers | B60B 7/08 |
| | | | | 301/37.102 |

FOREIGN PATENT DOCUMENTS

DE 10318407 A1 * 11/2004 .............. B60B 3/16
JP 03032903 A * 2/1991

* cited by examiner

*Primary Examiner* — Kip T Kotter
(74) *Attorney, Agent, or Firm* — Jason Rogers; King & Schickli, PLLC

(57) ABSTRACT

A center cap is provided for a motor vehicle wheel. That center cap includes a disc-shaped body having a plurality of radially arrayed mounting projections for engaging in a plurality of cooperating slots in the wheel. Further, a motor vehicle wheel is provided. That motor vehicle wheel includes a body incorporating a wheel hub having a central opening defined within a boundary wall and a center cap received and held in the central opening. The center cap includes a plurality of radially arrayed mounting projections while the body includes a matching plurality of slots and tapering channels sized and shaped to receive the plurality of radially arrayed mounting projections.

5 Claims, 7 Drawing Sheets

CENTER CAP FOR A MOTOR VEHICLE WHEEL

TECHNICAL FIELD

This document relates generally to the motor vehicle field and, more particularly, to a center cap for a motor vehicle wheel incorporating a unique structure for rotary mounting to the wheel hub of a motor vehicle wheel.

BACKGROUND

Center caps are typically plastic parts, usually carrying the logo of the producer of the motor vehicle to which the center cap is attached.

In the past, center caps have been connected to the wheel by means of a plurality of resilient locking tabs, commonly known in the art as "snap fits", that extend rearwardly from the center cap and are biased radially outwardly around the circumference of the center cap in order to engage a locking rib on the wheel to which the center cap is attached. A locking ring or other structure is then provided to secure the connection. See, for example, U.S. Pat. No. 7,651,171 to Kinslow, et al. and U.S. Pat. No. 4,040,672 to Imahashi.

This document relates to a new and improved center cap that is easily and conveniently connected to the wheel by a rotary motion. The center cap of this document requires less material, is generally easier to produce, has fewer failure modes and provides a generally higher-integrity connection in many different applications.

SUMMARY

In accordance with the purposes and benefits as described herein, a center cap is provided for a motor vehicle wheel. That center cap may be broadly described as comprising a disc-shaped body including a plurality of radially arrayed mounting projections for engaging in a plurality of cooperating slots in the wheel. The disc-shaped body includes a front face, a rear face and a knob for tightening and loosening the center cap relative to the wheel. That knob projects from the rear face of the center cap where it is only accessible after the wheel has been removed from the motor vehicle.

In one particularly useful embodiment, the knob projects at an angle substantially perpendicular to the plurality of radially arrayed projections.

In accordance with an additional aspect, a wheel is provided for a motor vehicle. That wheel comprises a body including a wheel hub having a central opening defined within a boundary wall and a center cap received and held in the central opening. That center cap includes a plurality of radially arrayed mounting projections while the body includes a matching plurality of slots sized and shaped to receive the plurality of radially arrayed mounting projections.

Still further, the body includes a plurality of locking channels in the boundary wall. One locking channel is provided in communication with each slot of the matching plurality of slots and the central opening. Further each locking channel has an end wall. In one possible embodiment, each locking channel gradually tapers in width from a first end opening into the slot toward the end wall, whereby the center cap may be tightened by rotation, thus translating the plurality of radially arrayed mounting projections toward the end walls of the plurality of locking channels.

In accordance with an additional aspect, a method is provided for connecting a center cap to a motor vehicle wheel. That method may be broadly described as comprising the steps of inserting the radially arrayed mounting projections on the center cap into the matching slots on the motor vehicle wheel and rotating the center cap relative to the motor vehicle wheel until the center cap is tightened in position.

More specifically, the method may include aligning the radially arrayed mounting projections on the center cap with cooperating mounting channels provided in the motor vehicle wheel and in communication with the matching slots. Further, the method may include aligning the radially arrayed mounting projections with the cooperating, tapering mounting channels in the motor vehicle wheel. This is then followed by rotating the center cap relative to the motor vehicle wheel by manipulating a knob on the rear face of the center cap.

In the following description, there are shown and described several preferred embodiments of the center cap and the motor vehicle wheel. As it should be realized, the center cap and motor vehicle wheel are capable of other, different embodiments and their several details are capable of modification in various, obvious aspects all without departing from the center cap and motor vehicle wheel as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the center cap and motor vehicle wheel and together with the description serve to explain certain principles thereof. In the drawing figures.

Reference will now be made in detail to the present preferred embodiments of the center cap and motor vehicle wheel, examples of which are illustrated in the accompanying drawing figures.

DETAILED DESCRIPTION

Figure 1:
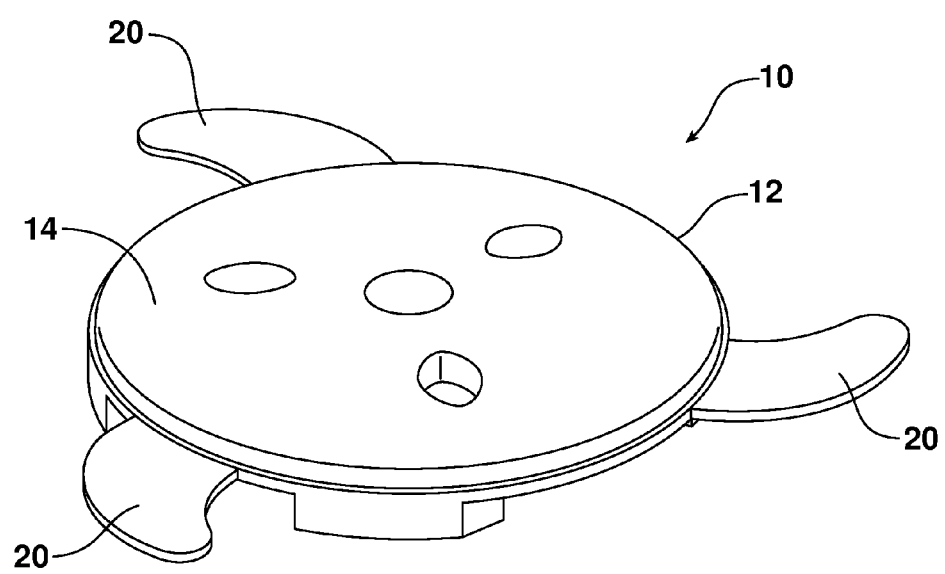
FIG. 1 is a detailed top perspective view of the center cap that is the subject matter of this document.
Figure 2:
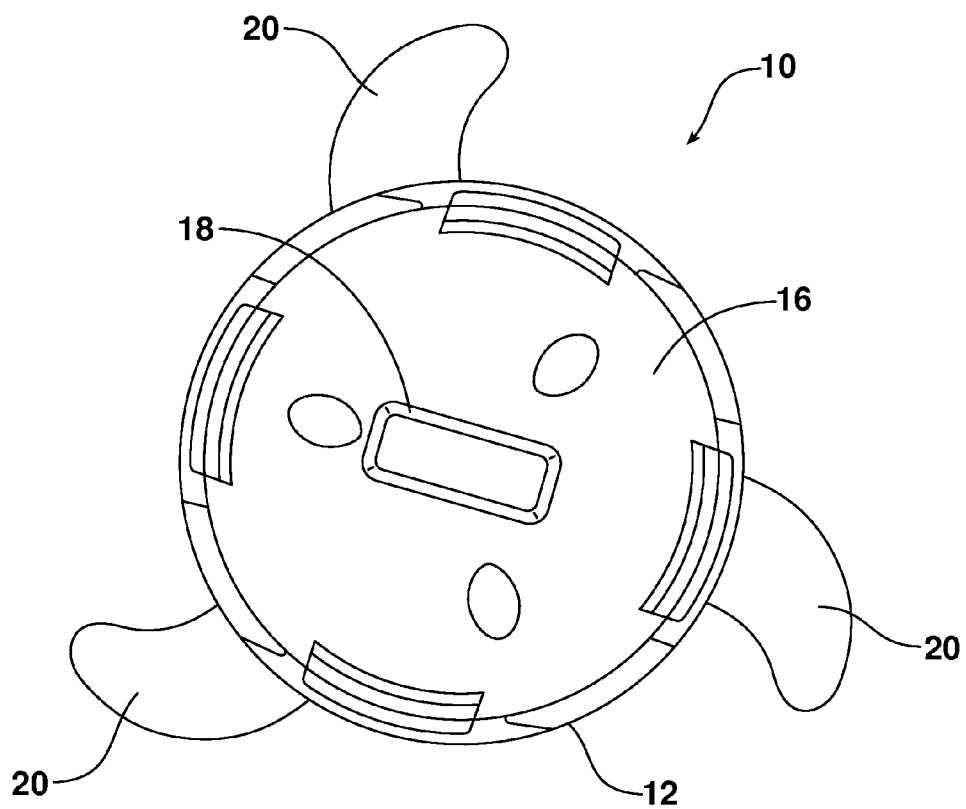
FIG. 2 is a rear elevational view of the center cap illustrated in FIG. 1.

Reference is now made to FIGS. 1 and 2, illustrating in detail a center cap 10 for a motor vehicle wheel. The center cap 10 includes a disc-shaped body 12 having an ornamental front face 14 and a rear face 16. The front face 14 may include a company logo or other indicia (not shown) while the rear face 16 includes a knob 18 which may be engaged and manipulated to tighten or loosen the center cap 10 from a motor vehicle wheel by rotary action. This is possible only after the wheel has been removed from the motor vehicle. Thus, the center cap 10 is protected from tampering and theft.

As further illustrated in FIGS. 1 and 2, the center cap 10 includes a plurality of radially arrayed mounting projections 20. In the illustrated embodiment, three mounting projections 20 are shown. It should be appreciated that any appropriate number of mounting projections 20 from two to six or more may be provided depending on the particular application. Further, in the illustrated embodiment, the projections 20 are substantially mango shaped, but the projections 20 may take the form of other shapes in alternate embodiments if desired.

Reference is now made to FIGS. 3-7 illustrating a motor vehicle wheel 30 which includes a wheel hub 32 and five spokes 33. As illustrated, the wheel hub 32 includes a central opening 34 defined within a boundary wall 36. The wheel 30 also includes a bolt circle 38. In the illustrated embodiment, the bolt circle 38 includes apertures 40 for receiving five lugs to secure the wheel to the motor vehicle. Here it should be appreciated that the wheel design may actually vary from platform to platform and that the illustrated design is only an example of one possible wheel 30 presented for purposes of illustration and description and is thus not limiting in scope.

Figure 3:
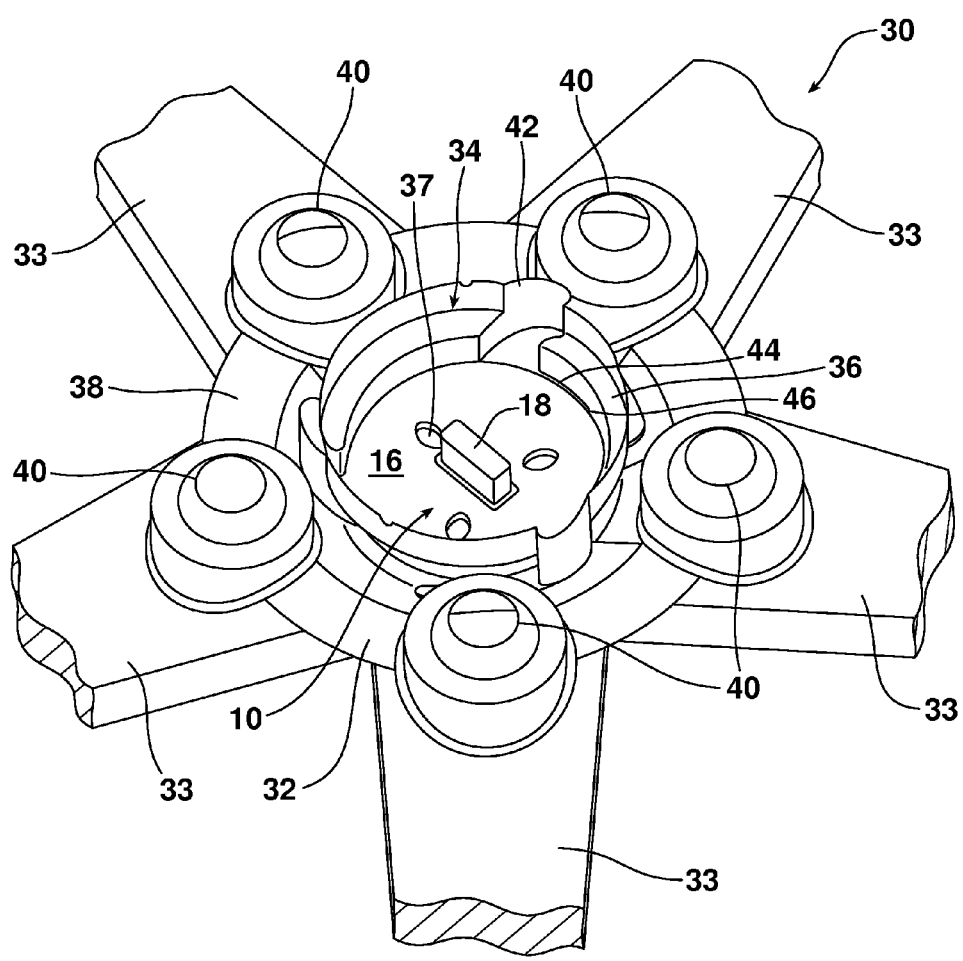
FIG. 3 is a rear perspective view showing how the center cap is inserted into the central opening of the wheel hub with projections on the center cap received in cooperating slots of the wheel hub.
Figure 4:
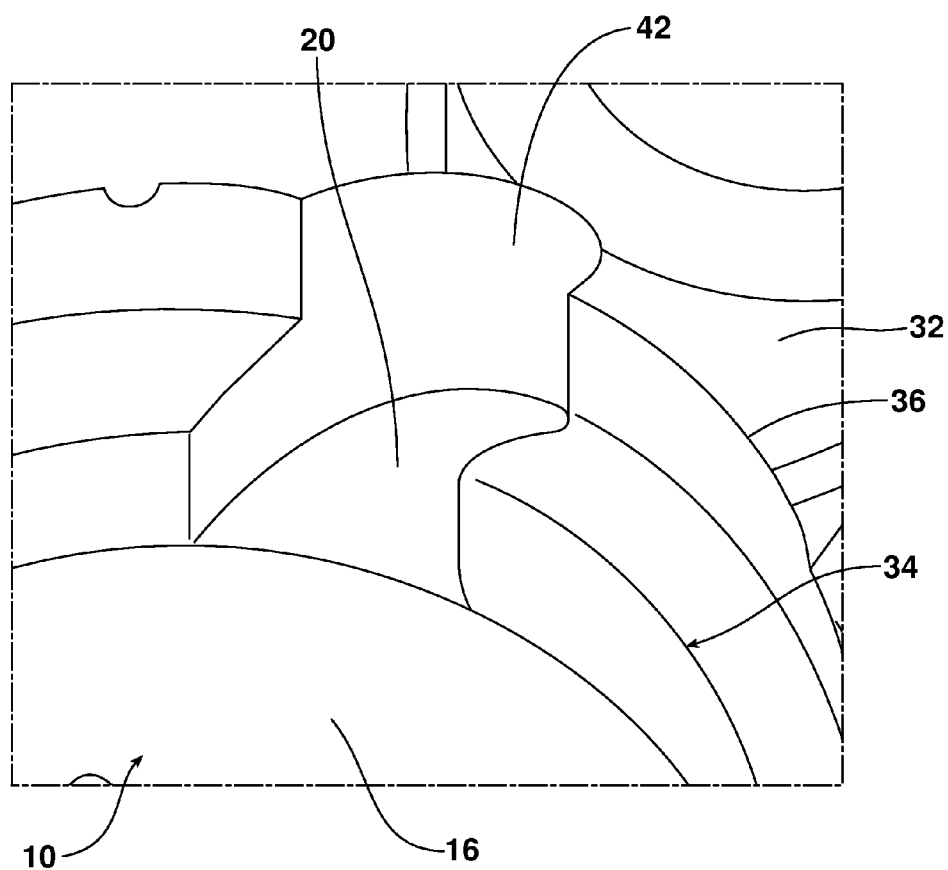
FIG. 4 is a detailed perspective view of one of the projections inserted and received in one of the slots provided on the wheel hub.
Figure 5:
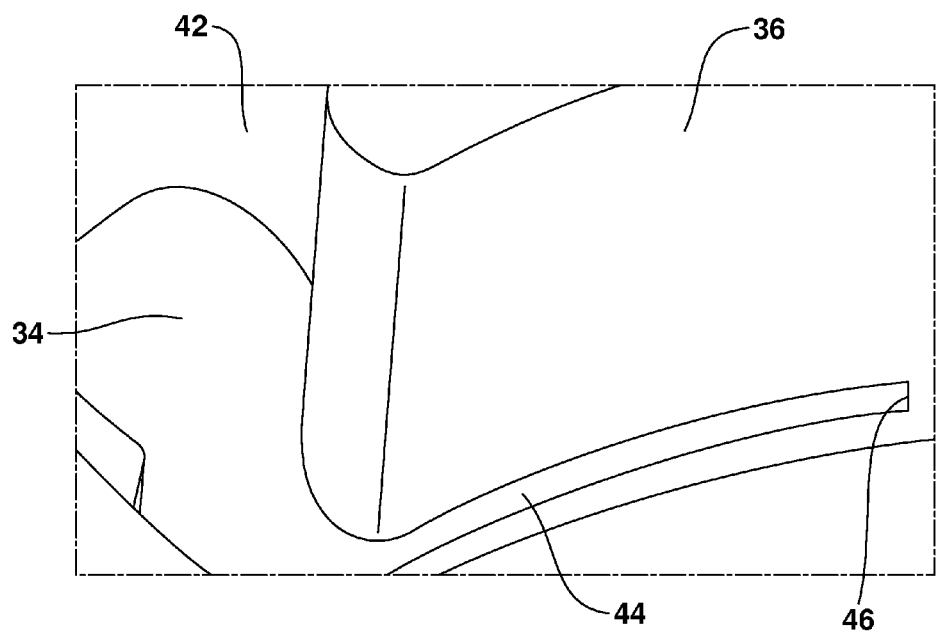
FIG. 5 is a detailed perspective view of a locking channel in the wheel hub in communication with the slot and the center opening.
Figure 6:
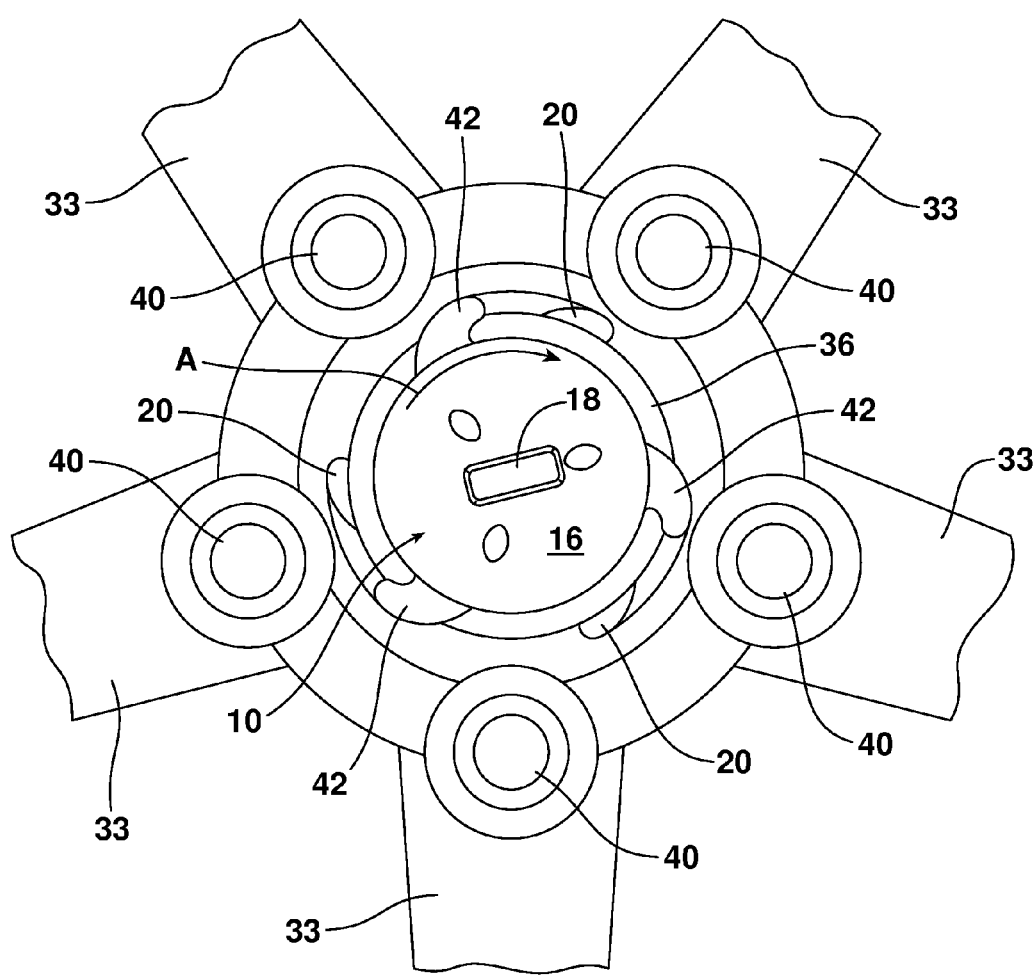
FIG. 6 is a rear elevational view showing the center cap fully seated and locked in the wheel hub.

As illustrated in FIGS. 3-7, the center cap 10 is received and held in the central opening 34 of the wheel hub 32. More specifically, as best illustrated in FIGS. 3,4 and 6, the wheel 30 includes a plurality of slots 42 that are sized and shaped to match the mounting projections 20 on the center cap. As illustrated, the slots 42 are radially arrayed around the central opening 34 and angularly oriented to correspond to the angular orientation of the mounting projections 20 on the center cap 10. The center cap 10 is secured in the central opening 34 of the wheel 30 by aligning the body 12 of the center cap with the central opening 34 and the projections 20 of the center cap with the slots 42 and then inserting the center cap into the wheel from the rear until the projections 20 engage the bottom of the slots 42.

Figure 7:
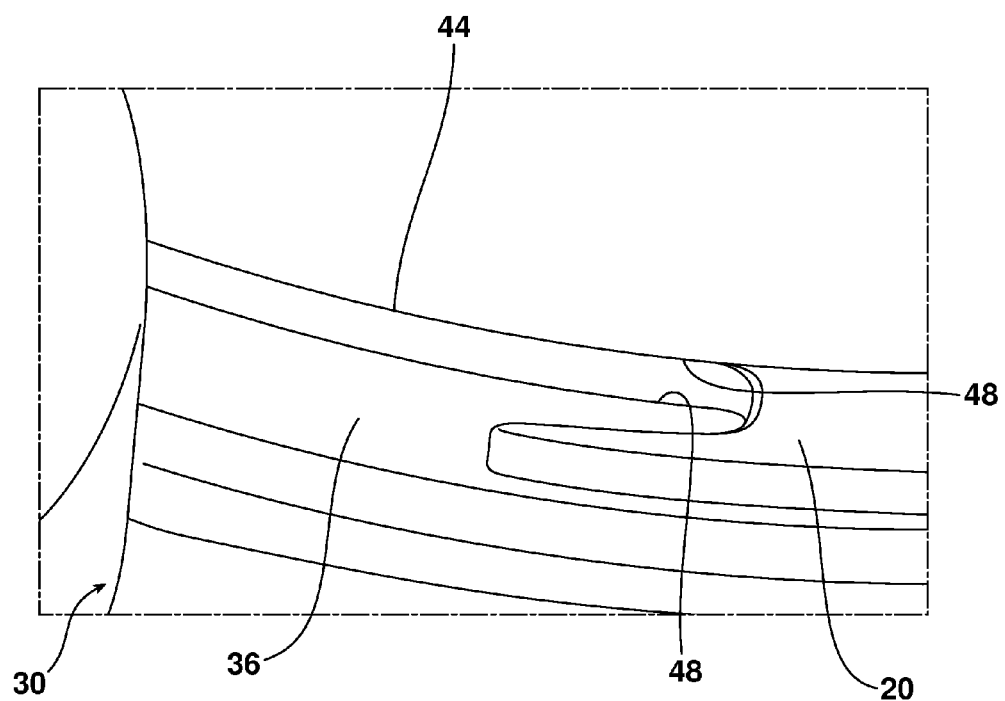
FIG. 7 is a detailed perspective view illustrating a projection received in the channel of the wheel hub.

As best illustrated in FIGS. 5-7, a plurality of locking channels 44 are provided in the boundary wall 36. One locking channel 44 is associated with each slot 42 and each locking channel is in communication with the associated slot and the central opening 34. More specifically, each slot 42 extends downwardly along the boundary wall 36 toward the bottom 37 of the central opening 34 (note bottom 37 is illustrated in FIG. 3 through an aperture in the center cap 10). In contrast, each locking channel 44 extends across the boundary wall 36 adjacent the bottom 37 of the central opening 34. Thus, the locking channels 44 are oriented substantially perpendicular to and offset from the slots 42.

When the center cap 10 is fully inserted into the central opening 34 of the wheel hub 32, the mounting projections 20 are aligned with the locking channels 44. The center cap 10 may then be rotated clockwise (note action arrow A in FIG. 6) to move the projections 20 into and through the locking channels 44 toward the end walls 46 of those channels opposite the opening with the slots. While not readily apparent from FIG. 7, it should be appreciated that each of the locking channels 44 may gradually taper in width from the first end opening with the slot 42 toward the end wall 46. Thus, as the center cap 10 is rotated and tightened, the projections engage tighter and tighter with the converging walls 48 defining the locking channels 44. This ensures that the center cap 10 is tightly and securely held in the central opening 34 of the wheel hub 32.

When it becomes necessary to remove the center cap 10 from the wheel hub 32, one must engage and manipulate the knob 18 on the rear face 16 of the center cap. As illustrated, the knob 18 projects from the rear face 16 at an angle that is substantially perpendicular to the plurality of radially arranged projections 20. The knob 18 is engaged to rotate the center cap in a counterclockwise direction until the mounting projections 20 are again fully received in the cooperating and matching slots 42 of the wheel, 30 thereby allowing the center cap to be withdrawn from the central opening 34.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A center cap for a wheel, comprising:
a disc-shaped body including a plurality of radially arrayed mounting projections for engaging in a plurality of cooperating slots in said wheel, wherein said disc-shaped body includes a front face, a rear face and a knob for tightening and loosening said center cap relative to said wheel, and wherein said knob projects from said rear face of said center cap.

2. The center cap of claim 1, wherein said knob projects at an angle substantially perpendicular to said plurality of radially arrayed mounting projections.

3. A method of connecting a center cap to a motor vehicle wheel, comprising:
inserting radially arrayed mounting projections on said center cap into matching slots on said motor vehicle wheel; and
rotating said center cap relative to said motor vehicle wheel by manipulating a knob on a rear face of said center cap until said center cap is tightened in position.

4. The method of claim 3, including aligning said radially arrayed mounting projections on said center cap with cooperating mounting channels provided in said motor vehicle wheel in communication with said matching slots.

5. The method of claim 3, including engaging said radially arrayed mounting projections in cooperating, tapering mounting channels in said motor vehicle wheel.

* * * * *